United States Patent
Okochi et al.

(10) Patent No.: US 11,588,371 B2
(45) Date of Patent: Feb. 21, 2023

(54) MOTOR-DRIVEN COMPRESSOR

(71) Applicant: KABUSHIKI KAISHA TOYOTA JIDOSHOKKI, Kariya (JP)

(72) Inventors: Takeshi Okochi, Kariya (JP); Yusuke Kinoshita, Kariya (JP); Junya Yano, Kariya (JP); Shumpei Yamakage, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 408 days.

(21) Appl. No.: 16/829,497

(22) Filed: Mar. 25, 2020

(65) Prior Publication Data
US 2020/0313504 A1    Oct. 1, 2020

(30) Foreign Application Priority Data

Mar. 27, 2019   (JP) .............................. JP2019-061272

(51) Int. Cl.
*H02K 5/22*      (2006.01)
*H02K 7/14*      (2006.01)
*F04C 23/02*     (2006.01)
*H02K 11/33*     (2016.01)

(52) U.S. Cl.
CPC ............. *H02K 5/225* (2013.01); *F04C 23/02* (2013.01); *H02K 7/14* (2013.01); *H02K 11/33* (2016.01); *F04C 2240/30* (2013.01); *F04C 2240/40* (2013.01); *F04C 2240/803* (2013.01); *H02K 2211/03* (2013.01)

(58) Field of Classification Search
CPC ...... B62D 5/0406; H02K 11/33; H02K 11/30; H02K 11/215; H02K 11/38; H02K 11/0073; H02K 5/225; H02K 5/22; H02K 5/10; H02K 5/1732; H02K 5/24; H02K 3/50; H02K 3/522; H02K 3/28; H02K 3/38; H02K 3/44; H02K 3/505
See application file for complete search history.

(56) References Cited

U.S. PATENT DOCUMENTS

| | | | |
|---|---|---|---|
| 2011/0095659 A1* | 4/2011 | Hattori | H05K 5/0247 310/68 D |
| 2011/0206544 A1 | 8/2011 | Saito et al. | |
| 2011/0211981 A1 | 9/2011 | Saito et al. | |
| 2012/0141307 A1* | 6/2012 | Kinoshita | F04C 23/008 417/410.1 |

(Continued)

FOREIGN PATENT DOCUMENTS

| | | |
|---|---|---|
| JP | 2014-161209 A | 9/2014 |
| JP | 2015-040538 A | 3/2015 |
| KR | 10-2018-0115787 A | 10/2018 |

*Primary Examiner* — Bryan R Perez
(74) *Attorney, Agent, or Firm* — Sughrue Mion, PLLC

(57) ABSTRACT

Connectors are each integrated with a holder in a state in which bus bars are projected. A first projection and a second projection of the holder are respectively inserted in a first insertion hole and a second insertion hole in a circuit substrate. This determines positions of the holder and the circuit substrate relative to each other. The holder has coil lead wire insertion holes, capacitor lead wire insertion holes, and element lead wire insertion holes. These insertion holes extend in the same direction as the direction in which the bus bars project from the holder.

12 Claims, 9 Drawing Sheets

(56) References Cited

U.S. PATENT DOCUMENTS

2013/0249335 A1\* 9/2013 Motoda ................ B62D 5/0406
　　　　　　　　　　　　　　　　　　　　　　310/71
2015/0056086 A1 　2/2015 Yano et al.
2020/0321836 A1 10/2020 Kagawa et al.

\* cited by examiner

MOTOR-DRIVEN COMPRESSOR

BACKGROUND

1. Field

The following description relates to a motor-driven compressor.

2. Description of Related Art

A motor-driven compressor includes a compression portion, an electric motor, a motor controller, and a housing. The compression portion compresses fluid. The electric motor drives the compression portion. The motor controller has a circuit substrate for driving the electric motor. The housing has an inverter accommodating chamber in which the motor controller is accommodated. A motor-driven compressor disclosed in Japanese Laid-Open Patent Publication No. 2015-40538 includes a connector having a bus bar that is electrically connected to the circuit substrate. The connector is arranged in the inverter accommodating chamber and, in this state, attached to a base member using a screw member or the like. A terminal pin is fixed to the housing and removably inserted in the connector. The terminal pin electrically connects the connector to the electric motor. The circuit substrate supplies electric power to the electric motor through the connector and the terminal pin, thus driving the electric motor.

The motor-driven compressor also includes multiple electronic components and a holder. The electronic components each have a component lead wire that is electrically connected to the circuit substrate. The holder holds the electronic components. The electronic components may include, for example, a filter element, such as a coil or a capacitor, and a switching element. The holder is accommodated in the inverter accommodating chamber and, in this state, attached to the base member using a screw member or the like. The holder improves the anti-vibration performance of the electronic components.

In the configuration disclosed in the aforementioned document, the connector and the electronic components, which are accommodated in the holder, are fixed to the base member. In this state, the bus bar and the component lead wires must be inserted through the circuit substrate simultaneously. This deteriorates the assemblability. To improve the assemblability, the connector and the electronic components, which are accommodated in the holder, may be mounted on the circuit substrate in advance before the terminal pin is inserted in the connector. However, in this case, the load applied from the terminal pin to the connector acts on the bus bar. The load may cause breakage in a portion connecting with the substrate with soldering.

The component lead wire may also be bent if the circuit substrate moves relative to the holder in a state in which the component lead wires of the electronic components are inserted into the circuit substrate.

SUMMARY

Accordingly, it is an objective of the present disclosure to provide a motor-driven compressor that limits breakage in a portion connecting with the connector on the substrate and bending in component lead wires of electronic components, and improve assemblability.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a motor-driven compressor is provided that includes a compression portion that compresses fluid, an electric motor that drives the compression portion, a motor controller that has a circuit substrate for driving the electric motor, a housing that has an inverter accommodating chamber for accommodating the motor controller, a connector, a terminal pin, an electronic component, and a holder. The connector has a connecting terminal and a bus bar. The bus bar is provided to electrically connect the connecting terminal to the circuit substrate. The terminal pin is fixed to the housing and removably inserted in the connecting terminal, thereby electrically connecting the connector and the electric motor to each other. The electronic component is electrically connected to the circuit substrate. The holder is made of plastic that holds the electronic component. The circuit substrate is fixed to the holder. The connector is integrated with the holder in a state in which the bus bar is electrically connected to the circuit substrate. The holder has a circumferential wall that surrounds the connector and is arranged at an outer side of an outer circumferential edge of the circuit substrate.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A motor-driven compressor 10 according to an embodiment will now be described with reference to FIGS. 1 to 9. The motor-driven compressor of the present embodiment is employed in, for example, a vehicle air conditioner.

Figure 1:
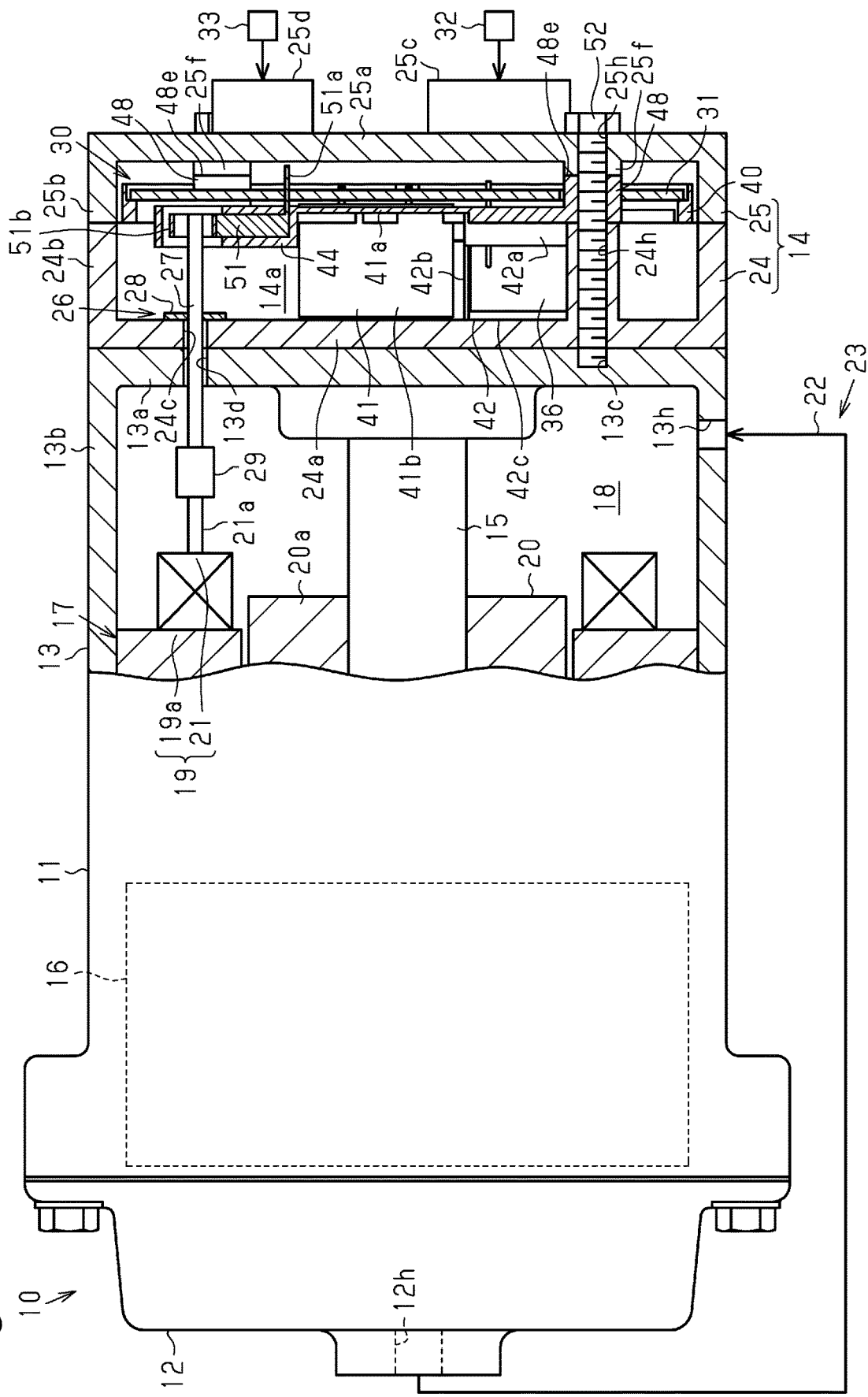
FIG. 1 is a partially cutaway cross-sectional side view of a motor-driven compressor according to one embodiment.

As shown in FIG. 1, the motor-driven compressor 10 includes a housing 11. The housing 11 is constituted by a discharge housing member 12, a motor housing member 13, and an inverter case 14. The discharge housing member 12 and the motor housing member 13 both have a tubular shape with a closed end. The motor housing member 13 is coupled to the discharge housing member 12. The inverter case 14 is coupled to the motor housing member 13. The discharge housing member 12, the motor housing member 13, and the inverter case 14 are made of metal material such as aluminum. The motor housing member 13 has a bottom wall 13a and a circumferential wall 13b. The circumferential wall 13b extends from the outer circumferential edge of the bottom wall 13a. The circumferential wall 13b has a tubular shape.

A rotary shaft 15 is accommodated in the motor housing member 13. A compression portion 16 and an electric motor 17 are also accommodated in the motor housing member 13. The electric motor 17 rotates the rotary shaft 15. The compression portion 16 is driven through rotation of the rotary shaft 15, thus compressing refrigerant as fluid. The compression portion 16 and the electric motor 17 are arranged along the rotation axis of the rotary shaft 15. The electric motor 17 is disposed between the compression portion 16 and the bottom wall 13a of the motor housing member 13. In the motor housing member 13, a motor chamber 18 is provided between the compression portion 16 and the bottom wall 13a to accommodate the electric motor 17.

The compression portion 16 is, for example, a scroll compressor constituted by a non-illustrated stationary scroll and a non-illustrated movable scroll. The stationary scroll is fixed to the inside of the motor housing member 13. The movable scroll is opposed to the stationary scroll.

The electric motor 17 is constituted by a tubular stator 19 and a rotor 20. The rotor 20 is arranged at the inner side of the stator 19. The rotor 20 rotates integrally with the rotary shaft 15. The stator 19 surrounds the rotor 20. The rotor 20 has a rotor core 20a and non-illustrated multiple permanent magnets. The rotor core 20a is secured to the rotary shaft 15. The permanent magnets are disposed in the rotor core 20a. The stator 19 has a tubular stator core 19a and a motor coil 21. The motor coil 21 is wound around the stator core 19a.

The circumferential wall 13b has a suction port 13h. A first end of an external refrigerant circuit 22 is connected to the suction port 13h. The discharge housing member 12 has a discharge port 12h. A second end of the external refrigerant circuit 22 is connected to the discharge port 12h. The suction port 13h is disposed in the circumferential wall 13b in the vicinity of the bottom wall 13a. The suction port 13h is continuous with the motor chamber 18.

Refrigerant is drawn into the motor chamber 18 from the external refrigerant circuit 22 through the suction port 13h. The refrigerant is then compressed by the compression portion 16 and flows into the external refrigerant circuit 22 via the discharge port 12h. The refrigerant passes through a heat exchanger and an expansion valve in the external refrigerant circuit 22 and returns into the motor chamber 18 via the suction port 13h. In other words, the motor housing member 13 has the suction port 13h to draw refrigerant from the exterior into the motor chamber 18. The motor-driven compressor 10 and the external refrigerant circuit 22 constitute a vehicle air conditioner 23.

The inverter case 14 is attached to the bottom wall 13a of the motor housing member 13. An inverter accommodating chamber 14a is provided in the inverter case 14 to accommodate the motor controller 30. In other words, the housing 11 has the inverter accommodating chamber 14a. The compression portion 16, the electric motor 17, and the motor controller 30 are arranged in this order in the axial direction of the rotary shaft 15.

Figure 2:
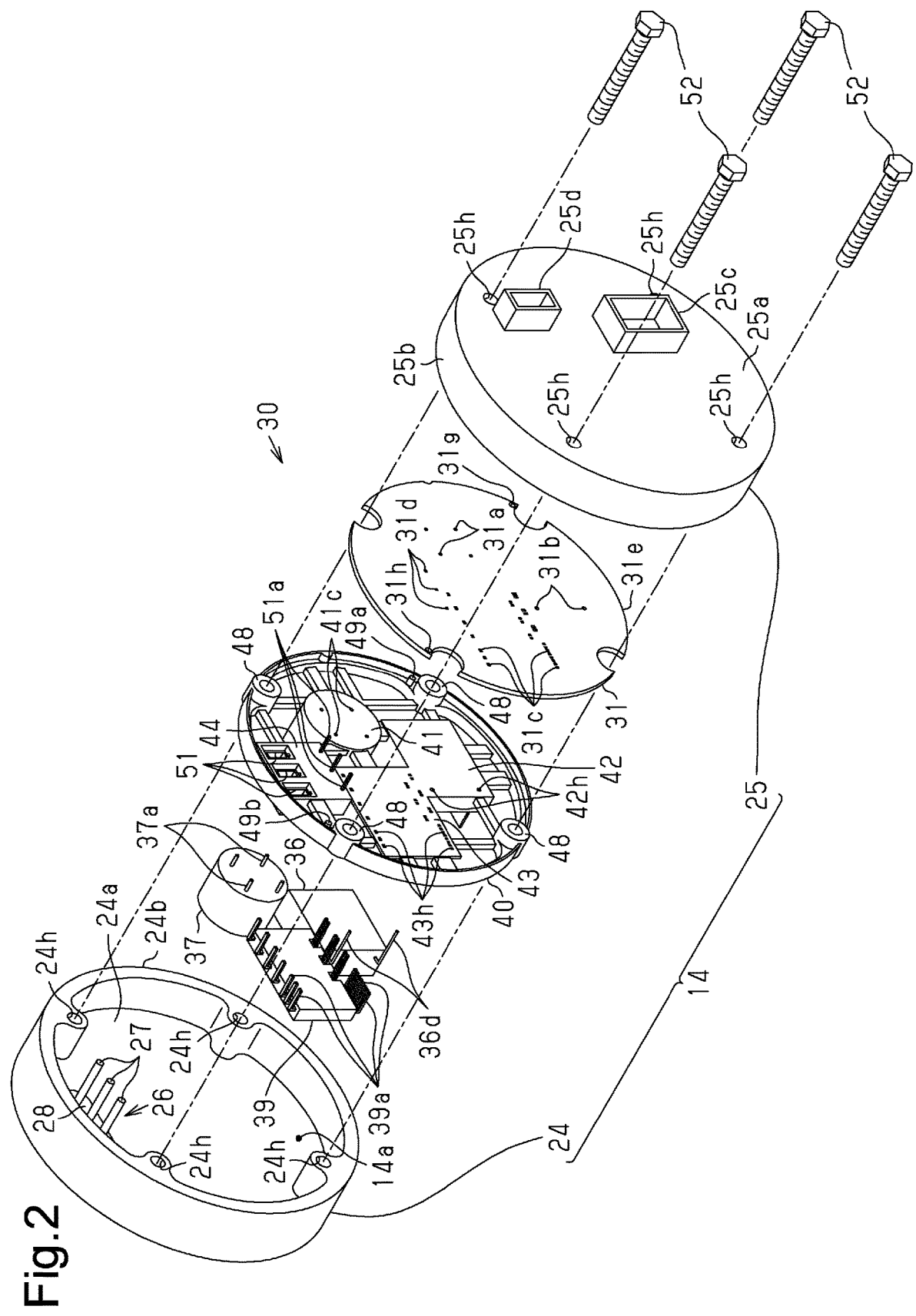
FIG. 2 is an exploded perspective view showing a section of the motor-driven compressor.

With reference to FIGS. 1 and 2, the inverter case 14 has a case body 24 and a lid member 25. The lid member 25 closes an opening of the case body 24. The case body 24 and the lid member 25 both have a tubular shape with a closed end. The case body 24 has a disk-like case bottom wall 24a and a case circumferential wall 24b. The case circumferential wall 24b extends from the outer circumferential edge of the case bottom wall 24a. The lid member 25 has a disk-like lid bottom wall 25a and a lid circumferential wall 25b. The lid circumferential wall 25b extends from the outer circumferential edge of the lid bottom wall 25a. The case circumferential wall 24b and the lid circumferential wall 25b both have a cylindrical shape.

The inner diameter of the case circumferential wall 24b is equal to the inner diameter of the lid circumferential wall 25b. The outer diameter of the case circumferential wall 24b is equal to the outer diameter of the lid circumferential wall 25b. The case body 24 is joined to the lid member 25 in a state in which the opening end face of the case circumferential wall 24b and the opening end face of the lid circumferential wall 25b face and contact each other. The inverter accommodating chamber 14a is defined by the case body 24 and the lid member 25. The inverter case 14 is attached to the bottom wall 13a of the motor housing member 13 in a state in which the outer surface of the case bottom wall 24a contacts the outer surface of the bottom wall 13a of the motor housing member 13.

A screw insertion hole 24h is formed in each of the four corners of the case body 24. Referring to FIG. 1, the bottom wall 13a of the motor housing member 13 has internally threaded holes 13c. Each of the internally threaded holes 13c is continuous with the corresponding one of the screw insertion holes 24h.

A tubular portion 25f projects from each of the four corners of the inner surface of the lid bottom wall 25a. The four tubular portions 25f are spaced at equal intervals, that is, at 90 degrees, in the circumferential direction of the case circumferential wall 24b. Also, as shown in FIG. 2, a screw insertion hole 25h is formed in each of the four corners of the lid bottom wall 25a and is continuous with the inside of the corresponding one of the tubular portions 25f. The screw insertion holes 25h extend through the lid bottom wall 25a in the thickness direction.

As illustrated in FIG. 1, the bottom wall 13a of the motor housing member 13 has a hole 13d extending through the bottom wall 13a. The case bottom wall 24a of the case body 24 has a hole 24c extending through the case bottom wall 24a. The holes 13d, 24c are continuous with each other.

With reference to FIGS. 1 and 2, a terminal pin 26 is attached to the case bottom wall 24a of the case body 24. The terminal pin 26 has three conductive members 27 and a support plate 28. The conductive members 27 each have a pillar-like shape. The support plate 28 closes the hole 24c and, in this state, is attached to the inner surface of the case bottom wall 24a.

Referring to FIG. 1, the conductive members 27 extend through the holes 13d, 24c. In this state, the conductive members 27 are supported by the case bottom wall 24a together with the support plate 28. A first end of each of the conductive members 27 thus projects into the motor chamber 18. A second end of each conductive member 27 projects into the inverter accommodating chamber 14a. A cluster block 29 is disposed in the motor chamber 18. Three motor wires 21a are routed out from a motor coil 21. The conductive members 27 are electrically connected to the corresponding motor wires 21a through the cluster block 29.

With reference to FIGS. 1 and 2, the motor controller 30 has a circuit substrate 31 to drive the electric motor 17. The circuit substrate 31 is accommodated in the inverter accommodating chamber 14a. The inverter accommodating chamber 14a also accommodates a holder 40. The holder 40 holds three connectors 51.

As illustrated in FIG. 1, each of the connectors 51 has a bus bar 51a and a connecting terminal 51b. The bus bar 51a has a first end, which is electrically connected to the circuit substrate 31 with soldering. The connecting terminal 51b has a rectangular tubular shape. The second end of each of the conductive members 27 is removably inserted in the corresponding one of the connecting terminals 51b. The bus bar 51a has a second end, which is integrated with the corresponding one of the connecting terminals 51b by being bonded with the connecting terminal 51b through welding, for example. That is, the bus bar 51a is provided to electrically connect the connecting terminal 51b to the circuit substrate 31. The conductive members 27 are inserted in the corresponding connector terminals 51b. This electrically connects the conductive members 27 to the corresponding connectors 51. In this manner, the connectors 51 are electrically connected to the electric motor 17 through the conductive members 27, the cluster block 29, and the motor wires 21a. In other words, the terminal pin 26 is removably inserted in the connectors 51 and serves to electrically connect the connectors 51 and the electric motor 17 to each other.

With reference to FIGS. 1 and 2, the inverter case 14 has a high-voltage connector 25c and a low-voltage connector 25d. The high-voltage and low-voltage connectors 25c, 25d project from the outer surface of the lid bottom wall 25a of the lid member 25. A connector of a high-voltage power source 32 is connected to the high-voltage connector 25c. A connector of a low-voltage power source 33 is connected to the low-voltage connector 25d. The high-voltage power source 32 is a high-voltage battery mounted in the vehicle, such as a lithium-ion rechargeable battery or a nickel-metal hydride rechargeable battery. The low-voltage power source 33 is a low-voltage battery that is mounted in the vehicle, such as a lead-acid battery, and has a lower voltage (12 V, for example) than the voltage of a high-voltage battery (400 V, for example).

Figure 3:
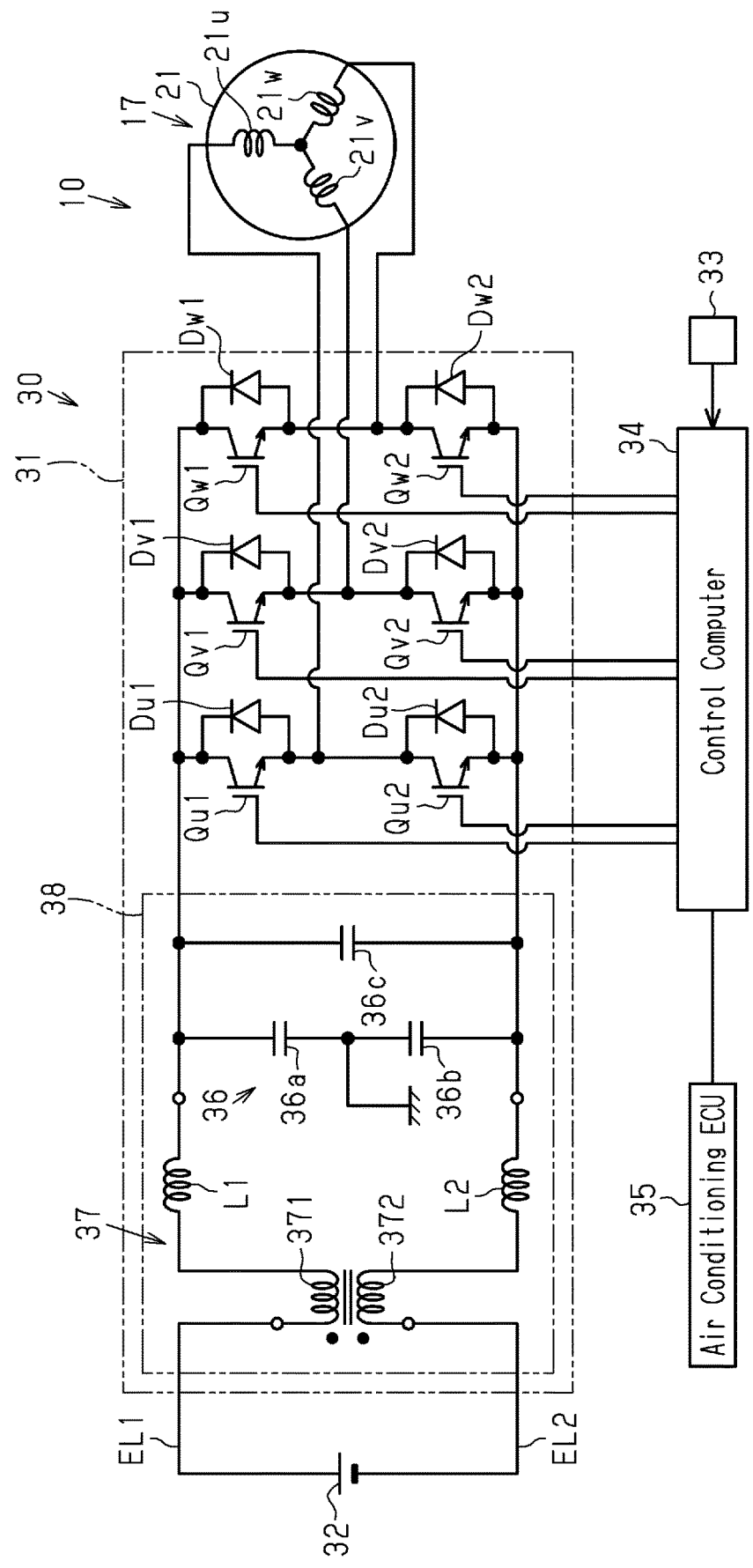
FIG. 3 is a circuit diagram representing the electric configuration of the motor-driven compressor.

Referring to FIG. 3, the motor coil 21 has a three-phase structure with a u-phase coil 21u, a v-phase coil 21v, and a w-phase coil 21w. In the present embodiment, the u-phase coil 21u, the v-phase coil 21v, and the w-phase coil 21w are connected in a Y-connection manner.

The motor controller 30 has multiple switching elements Qu1, Qu2, Qv1, Qv2, Qw1, Qw2. The switching elements Qu1, Qu2, Qv1, Qv2, Qw1, Qw2 perform switching to drive the electric motor 17. Each of the switching elements Qu1, Qu2, Qv1, Qv2, Qw1, Qw2 is an IGBT (a power switching element). Diodes Du1, Du2, Dv1, Dv2, Dw1, Dw2 are each connected to the corresponding one of the switching elements Qu1, Qu2, Qv1, Qv2, Qw1, Qw2. Each of the diodes Du1, Du2, Dv1, Dv2, Dw1, Dw2 is connected in parallel with the corresponding one of the switching elements Qu1, Qu2, Qv1, Qv2, Qw1, Qw2.

The switching elements Qu1, Qv1, Qw1 each constitute the upper arm of the corresponding one of the phases. The switching elements Qu2, Qv2, Qw2 each constitute the lower arm of the corresponding phase. The switching element Qu1 is connected in series with the switching element Qu2. The switching element Qv1 is connected in series with the switching element Qv2. The switching element Qw1 is connected in series with the switching element Qw2. The gate of each switching element Qu1, Qu2, Qv1, Qv2, Qw1, Qw2 is electrically connected to a control computer 34. The control computer 34 operates by receiving voltage from the low-voltage power source 33.

The collector of each switching element Qu1, Qv1, Qw1 is electrically connected to the positive electrode of the high-voltage power source 32 through a first connecting line EL1. The emitter of each switching element Qu2, Qv2, Qw2 is electrically connected to the negative electrode of the high-voltage power source 32 through a second connecting line EL2. A wire connects the emitter of the switching element Qu1 and the collector of the switching element Qu2 in series with each other. From the midpoint of this wire, the emitter of the switching element Qu1 and the collector of the switching element Qu2 are each electrically connected to the u-phase coil 21u. Another wire connects the emitter of the switching element Qv1 and the collector of the switching element Qv2 in series with each other. From the midpoint of this wire, the emitter of the switching element Qv1 and the collector of the switching element Qv2 are each electrically connected to the v-phase coil 21v. Another wire connects the emitter of the switching element Qw1 and the collector of the switching element Qw2 in series with each other. From the midpoint of this wire, the emitter of the switching element Qw1 and the collector of the switching element Qw2 are each electrically connected to the w-phase coil 21w.

The control computer 34 controls the drive voltage of the electric motor 17 by pulse width modulation. Specifically, the control computer 34 generates a PWM signal using a high-frequency triangle wave signal, as referred to as a carrier signal, and a voltage command signal for commanding a voltage. Using the PWM signal, the control computer 34 controls the switching (the ON-OFF control) of the switching elements Qu1, Qu2, Qv1, Qv2, Qw1, Qw2. This converts the DC voltage of the high-voltage power source 32 into AC voltage. By applying the AC voltage to the electric motor 17 as the drive voltage, the driving of the electric motor 17 is controlled.

Also, by controlling the PWM signal, the control computer 34 variably controls the duty cycle of the switching of each switching element Qu1, Qu2, Qv1, Qv2, Qw1, Qw2. This controls the rotational speed of the electric motor 17. The control computer 34 is electrically connected to an air conditioning ECU 35. The control computer 34 receives information regarding the target rotational speed of the electric motor 17 from the air conditioning ECU 35. The control computer 34 then rotates the electric motor 17 by the target rotational speed.

The motor-driven compressor 10 includes a capacitor 36 and a coil 37. The capacitor 36 is disposed at the input side of the switching elements Qu1, Qu2, Qv1, Qv2, Qw1, Qw2 and connected in parallel with the high-voltage power source 32. The capacitor 36 includes a first bypass capacitor 36a, a second bypass capacitor 36b, and a smoothing capacitor 36c. A first end of the first bypass capacitor 36a is electrically connected to the first connecting line EL1. A second end of the first bypass capacitor 36a is electrically connected to a first end of the second bypass capacitor 36b. The first bypass capacitor 36a is thus connected in series with the second bypass capacitor 36b. A second end of the second bypass capacitor 36b is electrically connected to the second connecting line EL2. The midpoint of the wire connecting the second end of the first bypass capacitor 36a to the first end of the second bypass capacitor 36b is grounded to, for example, the body of the vehicle.

A first end of the smoothing capacitor 36c is electrically connected to the first connecting line EL1. A second end of the smoothing capacitor 36c is electrically connected to the second connecting line EL2. The first bypass capacitor 36a and the second bypass capacitor 36b are connected in parallel with the smoothing capacitor 36c. The smoothing capacitor 36c is arranged between the first and second bypass capacitors 36a, 36b and the switching elements Qu1, Qu2, Qv1, Qv2, Qw1, Qw2.

The coil 37 is a common mode choke coil. The coil 37 has a first coil wire 371 and a second coil wire 372. The first coil wire 371 and the second coil wire 372 are respectively disposed on the first connecting line EL1 and the second connecting line EL2. The coil 37 also has virtual normal mode coils L1, L2, independently of the first and second coil wires 371, 372. In other words, the coil 37 of the present embodiment has, as an equivalent circuit, the first coil wire 371, the second coil wire 372, and the virtual normal mode coils L1, L2. The first coil wire 371 is connected in series with the virtual normal mode coil L1. The second coil wire 372 is connected in series with the virtual normal mode coil L2.

The coil 37, the first bypass capacitor 36a, the second bypass capacitor 36b, and the smoothing capacitor 36c decrease common mode noise. The common mode noise is noise in which an electric current flows in the same direction in the first connecting line EL1 and the second connecting line EL2. The common mode noise may be produced when, for example, the motor-driven compressor 10 and the high-voltage power source 32 are electrically connected to each other through any other path than the first or second connecting line EL1, EL2, such as the body of the vehicle. In other words, the coil 37, the first bypass capacitor 36a, the second bypass capacitor 36b, and the smoothing capacitor 36c constitute an LC filter 38. The coil 37 constitutes the LC filter 38 together with the capacitor 36. Therefore, the capacitor 36 and the coil 37 are filter elements constituting the LC filter 38.

Figure 4:
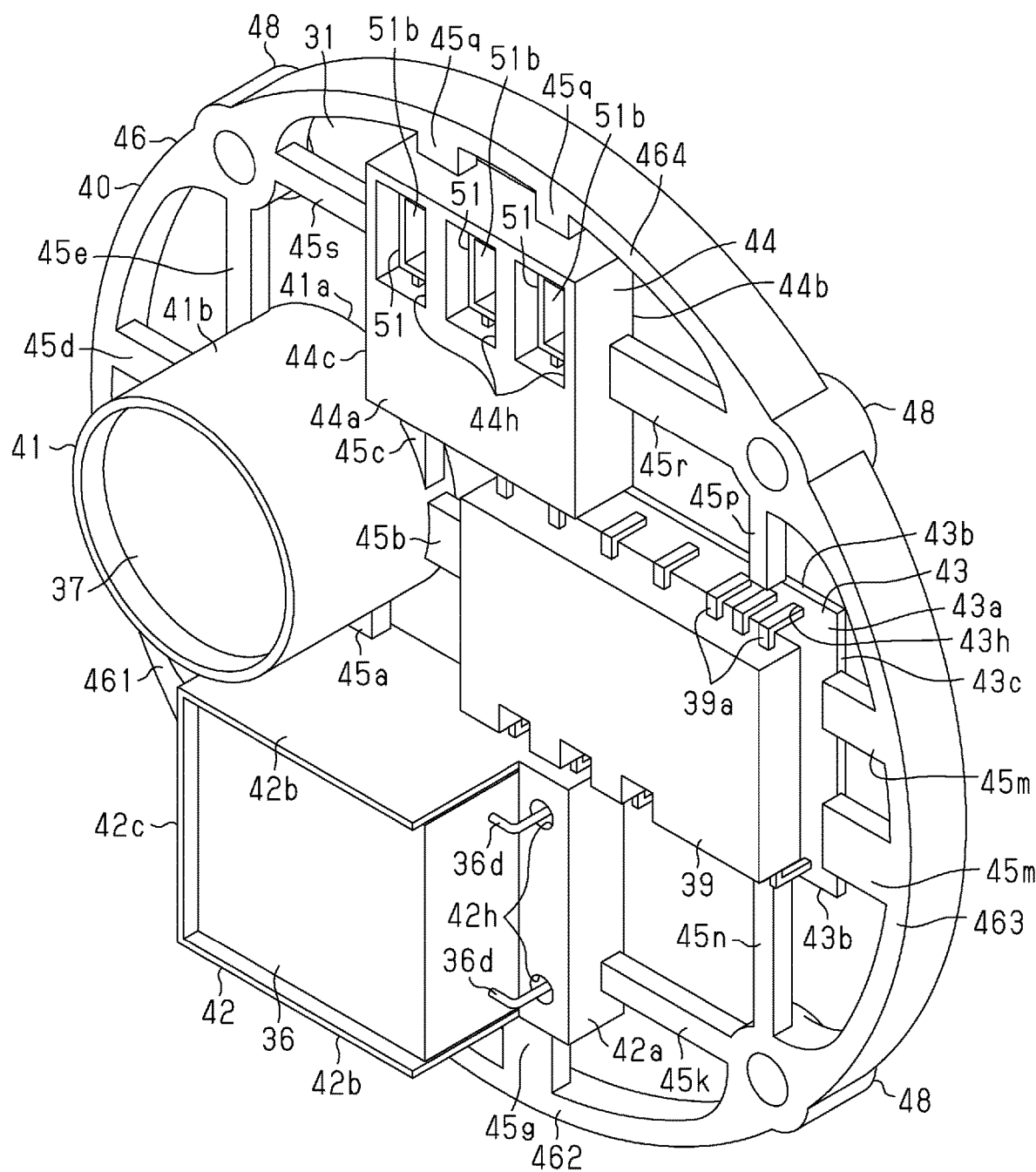
FIG. 4 is a perspective view showing the holder.
Figure 5:
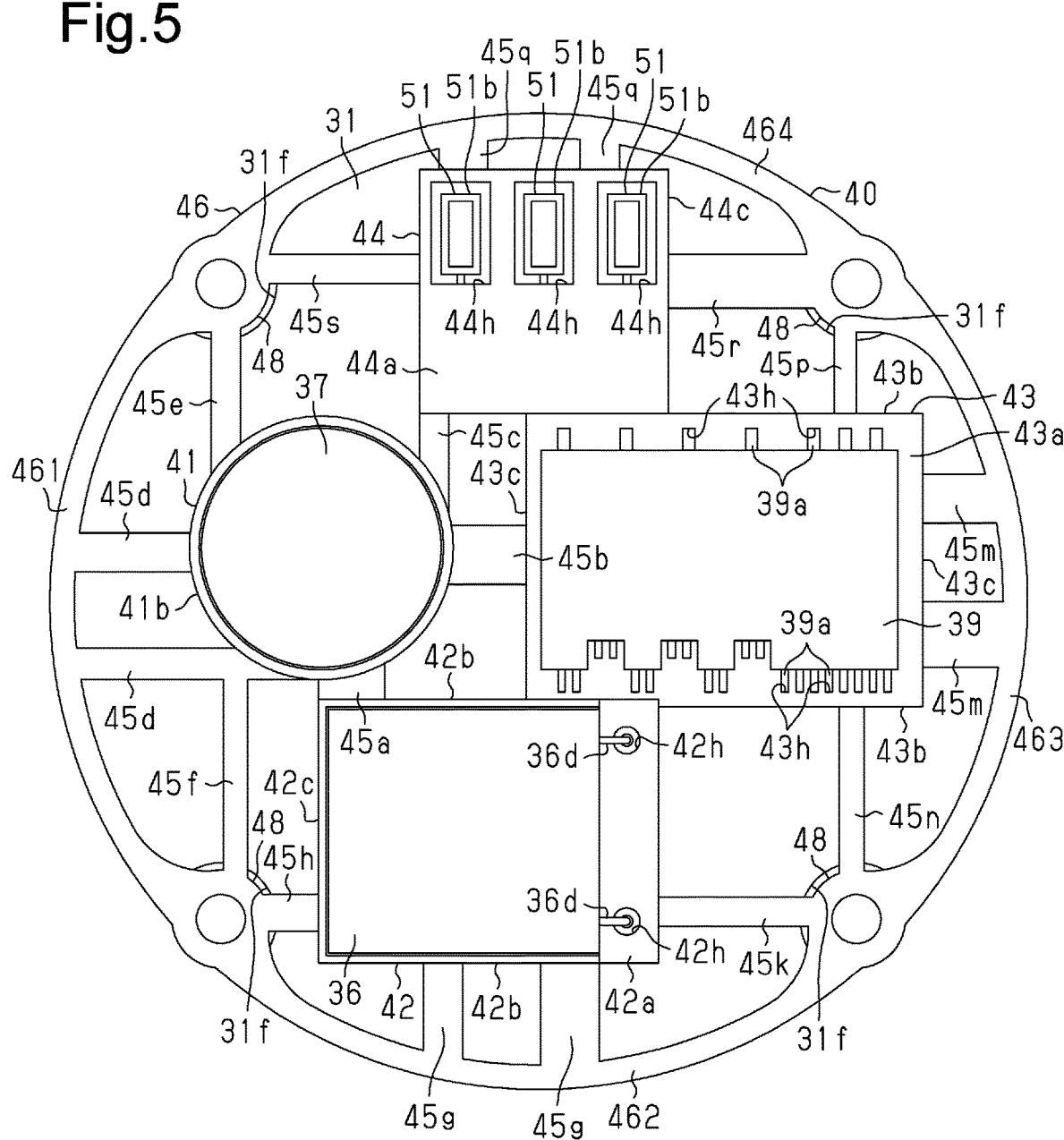
FIG. 5 is a plan view showing the holder as viewed from the opposite side from the substrate mounting surface.

As shown in FIGS. 4 and 5, the holder 40 holds the capacitor 36 and the coil 37. The holder 40 also holds an intelligent power module 39 in which the switching elements Qu1, Qu2, Qv1, Qv2, Qw1, Qw2 are modularized. In other words, the capacitor 36, the coil 37, and the switching elements Qu1, Qu2, Qv1, Qv2, Qw1, Qw2 are multiple electronic components held by the holder 40. The electronic components thus include the filter elements and the switching elements Qu1, Qu2, Qv1, Qv2, Qw1, Qw2.

The holder 40 has a coil holding portion 41, a capacitor holding portion 42, and an element holding portion 43. The coil holding portion 41 holds the coil 37. The capacitor holding portion 42 holds the capacitor 36. The element holding portion 43 holds the intelligent power module 39. The holder 40 is made of plastic.

Figure 6:
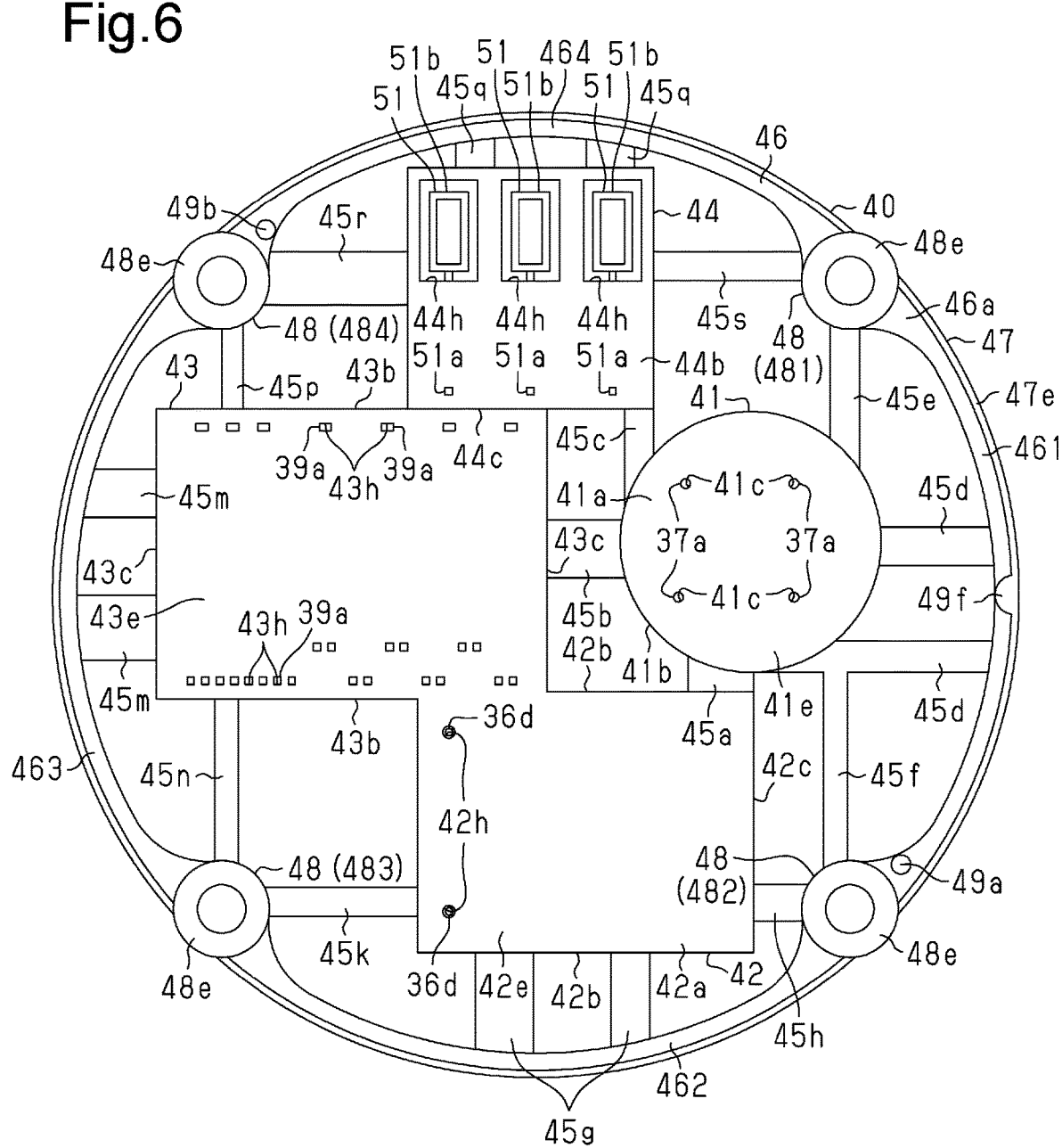
FIG. 6 is a plan view showing the holder as viewed from the side corresponding to the substrate mounting surface.

With reference to FIGS. 4, 5, and 6, the coil holding portion 41 has a lidded tubular shape. The coil holding portion 41 has a disk-like coil holding portion bottom wall 41a and a cylindrical coil holding portion circumferential wall 41b. The coil holding portion circumferential wall 41b extends from the outer circumferential section of the coil holding portion bottom wall 41a. The coil 37, as a whole, has a pillar-like shape. The coil 37 is accommodated in and held by the coil holding portion 41. Adhesive is provided between the coil 37 and the coil holding portion bottom wall 41a to stop the coil 37 from falling off the coil holding portion 41.

The coil holding portion bottom wall 41a has multiple coil lead wire insertion holes 41c. Coil lead wires 37a are routed out of the coil 37 and inserted in the corresponding coil lead wire insertion holes 41c. The coil lead wires 37a extend from inside the coil holding portion 41 and then pass through the coil lead wire insertion holes 41c, projecting from an outer surface 41e of the coil holding portion bottom wall 41a to the exterior of the coil holding portion 41.

The capacitor holding portion 42 has a mounting wall 42a, two support walls 42b, and a coupling wall 42c. The support walls 42b extend from the outer circumferential edge of the mounting wall 42a. The mounting wall 42a has an elongated rectangular plate-like shape in a plan view. The capacitor 36 is mounted on the mounting wall 42a. The capacitor 36, as a whole, has a rectangular block-like shape.

The support walls 42b and the coupling wall 42c each have a thin and flat rectangular plate-like shape. The support walls 42b and the coupling wall 42c each extend in a direction perpendicular to the mounting wall 42a. The support walls 42b each extend from the corresponding one of the mutually opposed long-side edges of the mounting wall 42a. The support walls 42b are opposed to each other, extending parallel to each other. The coupling wall 42c extends from the short-side edge that connects the elongate-side edges of the mounting wall 42a. The coupling wall 42c couples the support walls 42b to each other.

The direction in which the support walls 42b and the coupling wall 42c extend from the mounting wall 42a is the same as the direction in which the coil holding portion circumferential wall 41b extends from the coil holding portion bottom wall 41a. The edges of the support walls 42b and the coupling wall 42c opposite to the mounting wall 42a are flush with the edges of the coil holding portion circumferential wall 41b opposite to the coil holding portion bottom wall 41a.

The capacitor 36 is surrounded by the support walls 42b and the coupling wall 42c and, in this state, held by the capacitor holding portion 42. Adhesive is provided between the capacitor 36 and the mounting wall 42a to stop the capacitor 36 from falling off the capacitor holding portion 42. The support walls 42b and the coupling wall 42c extend along the outer surface of the capacitor 36.

The mounting wall 42a has multiple capacitor lead wire insertion holes 42h. Capacitor lead wires 36d project from the capacitor 36 and are inserted into the corresponding capacitor lead wire insertion holes 42h. The capacitor lead wires 36d pass through the capacitor lead wire insertion holes 42h, projecting from the outer surface 42e of the mounting wall 42a.

The element holding portion 43 has an elongated rectangular plate-like shape in a plan view. The element holding portion 43 has a mounting surface 43a. The intelligent power module 39 is mounted on the mounting surface 43a. The element holding portion 43 has two long-side edges 43b and two short-side edges 43c. Adhesive is provided between the intelligent power module 39 and the mounting surface 43a. The intelligent power module 39 is attached to the mounting surface 43a using a non-illustrated screw member.

The element holding portion 43 has multiple element lead wire insertion holes 43h. Element lead wires 39a project from the intelligent power module 39 and are inserted into the corresponding element lead wire insertion holes 43h. The element lead wires 39a pass through the element lead wire insertion holes 43h, projecting from an outer surface 43e of the element holding portion 43 opposite to the mounting surface 43a.

The holder 40 has a connector holding portion 44 to hold the connectors 51. The connector holding portion 44 has a flat rectangular block-like shape. The connector holding portion 44 has a first surface 44a and a second surface 44b. The first surface 44a and the second surface 44b are arranged in the thickness direction of the connector holding portion 44. The connector holding portion 44 also has a circumferential wall 44c. The circumferential wall 44c connects the first surface 44a and the second surface 44b to each other. The connector holding portion 44 has three connector holes 44h. Each of the connector holes 44h has an elongated rectangular shape in a plan view. The connector holes 44h extend through the connector holding portion 44 in the thickness direction.

The connecting terminal 51b of each connector 51 is arranged in the corresponding connector hole 44h. The axial direction of the connecting terminal 51b coincides with the axial direction of the connector hole 44h. A proximal end of the bus bar 51a of each connector 51 is embedded in the connector holding portion 44. The bus bar 51a are each curved in a direction separating from the first surface 44a in the interior of the connector holding portion 44. A distal end of each bus bar 51a projects from the second surface 44b. As a result, the connectors 51 are integrated with the holder 40 in a state in which the distal ends of the bus bar 51a project from the holder 40 toward the circuit substrate 31.

As shown in FIG. 6, the coil lead wire insertion holes 41c, the capacitor lead wire insertion holes 42h, and the element lead wire insertion holes 43h extend in the same direction as the direction in which the bus bar 51a project from the holder 40.

One of the long-side edges 43b of the element holding portion 43 partially extends continuously to a section of the circumferential wall 44c of the connector holding portion 44. The other one of the long-side edges 43b of the element holding portion 43 partially extends continuously to a section of one of the support walls 42b of the capacitor holding portion 42. The coil holding portion 41 is coupled to one of the support walls 42b of the capacitor holding portion 42 by a first beam portion 45a. The coil holding portion 41 is also coupled to one of the short-side edges 43c of the element holding portion 43 by a second beam portion 45b. The coil holding portion 41 is further coupled to the circumferential wall 44c of the connector holding portion 44 by a third beam portion 45c.

The holder 40 has a substrate mounting portion 46 and a holder circumferential wall 47. The substrate mounting portion 46 has a substrate mounting surface 46a. The circuit substrate 31 is mounted on the substrate mounting surface 46a. The holder circumferential wall 47 is a cylindrical circumferential wall section and extends from the outer circumferential section of the substrate mounting surface 46a. As viewed in the axial direction of the holder circumferential wall 47, the substrate mounting portion 46 has an annular shape surrounding the coil holding portion 41, the capacitor holding portion 42, the element holding portion 43, and the connector holding portion 44. The substrate mounting surface 46a is a flat surface.

The inner circumferential surface of the substrate mounting portion 46 extends continuously to the inner circumferential edge of the substrate mounting surface 46a. The inner circumferential surface of the holder circumferential wall 47 extends continuously to the outer circumferential edge of the substrate mounting surface 46a. The axial direction of the substrate mounting portion 46 coincides with the axial direction of the holder circumferential wall 47. The direction in which the holder circumferential wall 47 extends from the outer circumferential section of the substrate mounting surface 46a is opposite to the direction in which the coil holding portion circumferential wall 41b extends from the coil holding portion bottom wall 41a and the direction in which the support walls 42b and the coupling wall 42c extend from the mounting wall 42a.

The holder 40 has four cylindrical boss portions 48. The boss portions 48 bulge from the inner circumferential surface of the substrate mounting portion 46. The boss portions 48 are spaced apart at equal intervals, that is, at 90 degrees, in the circumferential direction of the substrate mounting portion 46. An end face 48e of each of the boss portions 48 projects with respect to an edge 47a of the holder circumferential wall 47.

The substrate mounting portion 46 has a first mounting portion 461, a second mounting portion 462, a third mounting portion 463, and a fourth mounting portion 464. Each of the first to fourth mounting portions 461, 462, 463, 464 couples two of the boss portions 48 that are adjacent to each other in the circumferential direction of the substrate mounting portion 46. In the structure including the coil holding portion 41, the capacitor holding portion 42, the element holding portion 43, and the connector holding portion 44, the first mounting portion 461, the second mounting portion 462, the third mounting portion 463, and the fourth mounting portion 464 are respectively arranged closest to the coil holding portion 41, the capacitor holding portion 42, the element holding portion 43, and the connector holding portion 44.

The coil holding portion 41 is coupled to the inner surface of the first mounting portion 461 by two fourth beam portions 45d. The coil holding portion 41 is also coupled to one (a first boss portion 481) of the two boss portions 48 that are located at the opposite sides of the first mounting portion 461 by a fifth beam portion 45e. One of the fourth beam portions 45d is close to the other one (a second boss portion 482) of the boss portions 48 that are located at the opposite sides of the first mounting portion 461. This fourth beam portion 45d is coupled to the second boss portion 482 by a sixth beam portion 45f. The coil holding portion 41 is thus coupled to the second boss portion 482 by the fourth beam portions 45d and the sixth beam portion 45f.

The capacitor holding portion 42 is coupled to the inner surface of the second mounting portion 462 by two seventh beam portions 45g. The capacitor holding portion 42 is also coupled to one (a second boss portion 482) of the boss portions 48 that are located at the opposite sides of the second mounting portion 462 by an eighth beam portion 45h. In other words, the sixth and eighth beam portions 45f, 45h are coupled to the same boss portion 48 (the second boss portion 482). The capacitor holding portion 42 is further coupled to the other one (a third boss portion 483) of the boss portions 48 that are located at the opposite sides of the second mounting portion 462 by a ninth beam portion 45k.

The element holding portion 43 is coupled to the inner surface of the third mounting portion 463 by two tenth beam portions 45m. The element holding portion 43 is also coupled to one (the third boss portion 483) of the boss portions 48 that are located at the opposite sides of the third mounting portion 463 by an eleventh beam portion 45n. The ninth and eleventh beam portions 45k, 45n are coupled to the same boss portion 48 (the third boss portion 483). The capacitor holding portion 42 is further coupled to the other one (a fourth boss portion 484) of the boss portions 48 that are located at the opposite sides of the third mounting portion 463 by a twelfth beam portion 45p.

The connector holding portion 44 is coupled to the inner surface of the fourth mounting portion 464 by two thirteenth beam portions 45q. The connector holding portion 44 is also coupled to one (the fourth boss portion 484) of the boss portions 48 that are located at the opposite sides of the fourth mounting portion 464 by a fourteenth beam portion 45r. The twelfth and fourteenth beam portions 45p, 45r are coupled to the same boss portion 48 (the fourth boss portion 484). The connector holding portion 44 is further coupled to the other one (the first boss portion 481) of the boss portions 48 that are located at the opposite sides of the fourth mounting portion 464 by a fifteenth beam portion 45s. The fifth and fifteenth beam portions 45e, 45s are coupled to the same boss portion 48 (the first boss portion 481).

A columnar first projection 49a projects from the first mounting portion 461 in the vicinity of the second boss portion 482. Also, a columnar second projection 49b projects from the fourth mounting portion 464 in the vicinity of the fourth boss portion 484. The first and second projections 49a, 49b are spaced apart at approximately 180 degrees in the circumferential direction of the substrate mounting portion 46. A bulging portion 49f projects from the inner circumferential surface of the holder circumferential wall 47. The outer circumferential surface of the bulging portion 49f has an arcuate shape. The bulging portion 49f is disposed in the middle of the first mounting portion 461.

Figure 7:
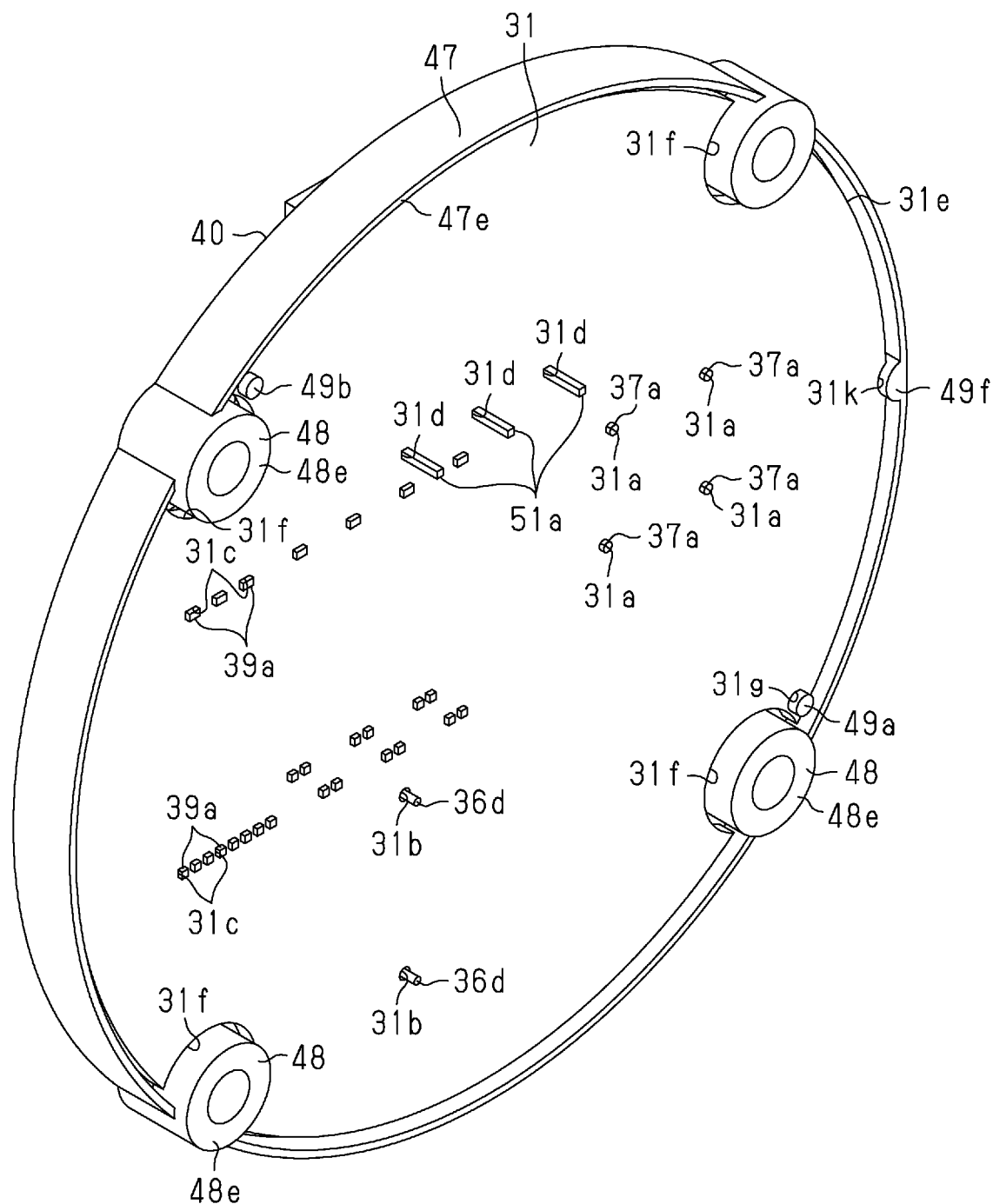
FIG. 7 is a perspective view showing a state in which the circuit substrate is mounted on the holder.
Figure 8:
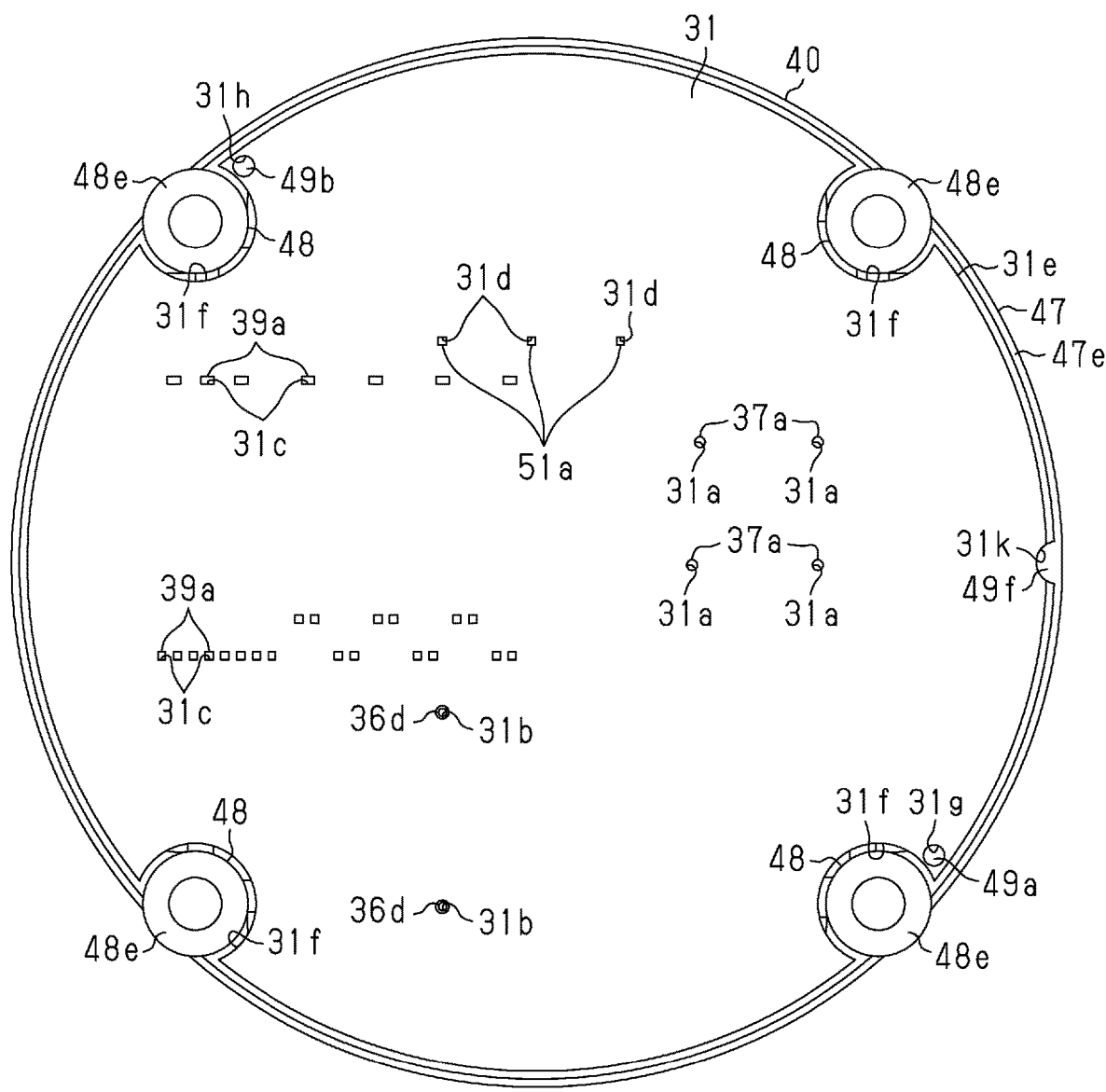
FIG. 8 is a plan view showing the state in which the circuit substrate is mounted on the holder.

As shown in FIGS. 7 and 8, the circuit substrate 31 has a disk-like shape. The outer diameter of the circuit substrate 31 is slightly smaller than the inner diameter of the holder circumferential wall 47. The circuit substrate 31 has coil lead wire connecting holes 31a, capacitor lead wire connecting holes 31b, and element lead wire connecting holes 31c. The coil lead wires 37a, the capacitor lead wires 36d, and the element lead wires 39a are respectively inserted into the coil lead wire connecting holes 31a, the capacitor lead wire connecting holes 31b, and the element lead wire connecting holes 31c. The circuit substrate 31 also has multiple connector lead wire connecting holes 31d. The bus bars 51a are inserted into the corresponding connector lead wire connecting holes 31d. The coil lead wire connecting holes 31a, the capacitor lead wire connecting holes 31b, the element lead wire connecting holes 31c, and the connector lead wire connecting holes 31d extend through the circuit substrate 31 in the thickness direction.

The coil lead wires 37a are electrically connected to the circuit substrate 31 by soldering or the like while being inserted into the corresponding coil lead wire connecting holes 31a. The coil 37 is thus mounted on the circuit substrate 31 through the coil lead wires 37a. The capacitor lead wires 36d are electrically connected to the circuit substrate 31 by soldering or the like while being inserted into the corresponding capacitor lead wire connecting holes 31b. The capacitor 36 is thus mounted on the circuit substrate 31 through the capacitor lead wires 36d. The element lead wires 39a are electrically connected to the circuit substrate 31 by soldering or the like while being inserted into the corresponding element lead wire connecting holes 31c. The intelligent power module 39 is thus mounted on the circuit substrate 31 through the element lead wires 39a. The bus bars 51a are electrically connected to the circuit substrate 31 by soldering or the like while being inserted into the corresponding connector lead wire connecting holes 31d. The connectors 51 are thus electrically connected to the circuit substrate 31.

Therefore, the capacitor 36 is an electronic component having the capacitor lead wires 36d, which are electrically connected to the circuit substrate 31 while being inserted into the corresponding capacitor lead wire connecting holes 31b. The coil 37 is an electronic component having the coil lead wires 37a, which are electrically connected to the circuit substrate 31 while being inserted into the corresponding coil lead wire connecting holes 31a. Each of the switching elements Qu1, Qu2, Qv1, Qv2, Qw1, Qw2 is an electronic component having the corresponding element lead wires 39a, which are electrically connected to the circuit substrate 31 while being inserted into the corresponding element lead wire connecting holes 31c. That is, each of the capacitor lead wires 36d, the coil lead wires 37a, and the element lead wires 39a is a component lead wire of the corresponding electronic component that is electrically connected to the circuit substrate 31 while being inserted into the corresponding one of the capacitor lead wire connecting holes 31b, the coil lead wire connecting holes 31a, and the element lead wire connecting holes 31c.

An outer circumferential edge 31e of the circuit substrate 31 extends along the inner circumferential surface of the holder circumferential wall 47. The outer circumferential edge 31e of the circuit substrate 31 has four extending edges 31f. Each of the extending edges 31f extends along the outer circumferential surface of the corresponding one of the boss portions 48. The extending edges 31f are each provided in the outer circumferential edge 31e of the circuit substrate 31 in a dented manner. Each extending edge 31f has an arcuate shape. The extending edges 31f are spaced apart at equal intervals, that is, at 90 degrees, in the circumferential direction of the circuit substrate 31.

The circuit substrate 31 has a circular first insertion hole 31g. The first projection 49a is inserted into the first insertion hole 31g. The first insertion hole 31g extends through the circuit substrate 31 in the thickness direction. The diameter of the first insertion hole 31g is slightly greater than the outer diameter of the first projection 49a. The circuit substrate 31 has a circular second insertion hole 31h. The second projection 49b is inserted into the second insertion hole 31h. The second insertion hole 31h extends through the circuit substrate 31 in the thickness direction. The diameter of the second insertion hole 31h is slightly greater than the outer diameter of the second projection 49b. The outer circumferential edge 31e of the circuit substrate 31 has a recess 31k. The recess 31k is engageable with the bulging portion 49f. The recess 31k extends along the outer surface of the bulging portion 49f.

Figure 9:
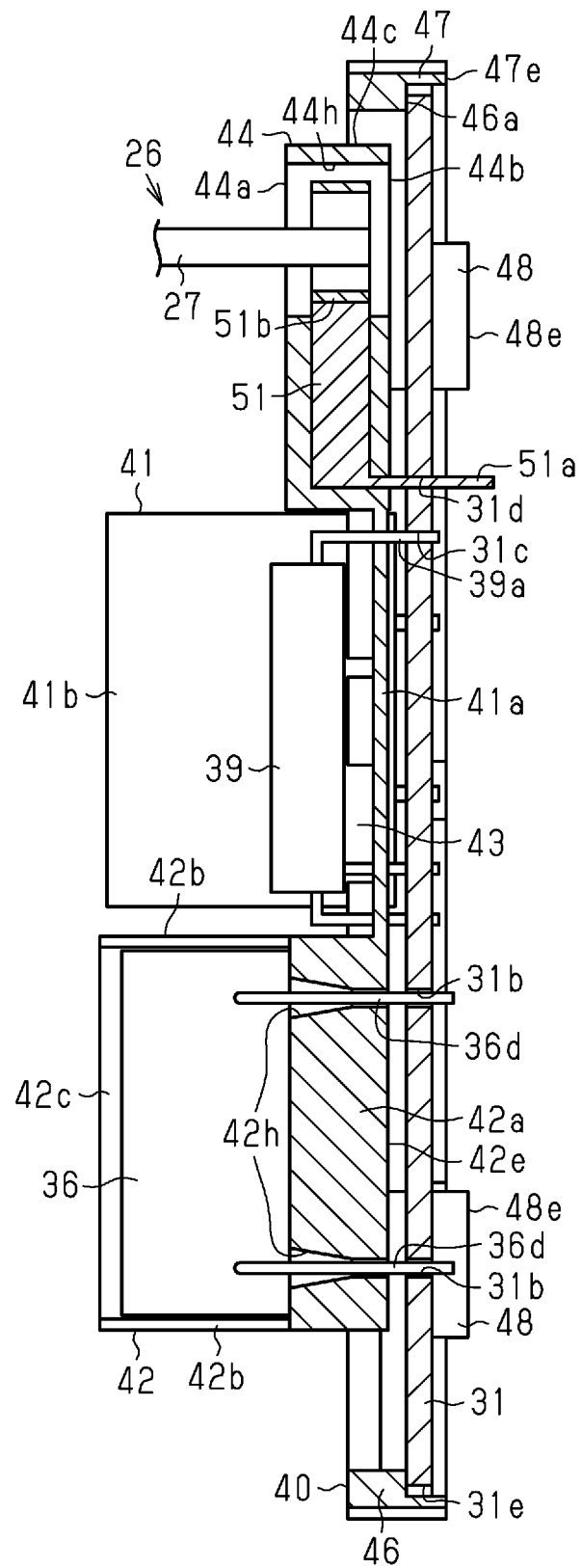
FIG. 9 is a cross-sectional view showing the holder.

With reference to FIG. 9, the circuit substrate 31 is mounted on the substrate mounting surface 46a of the holder 40. The holder circumferential wall 47 covers the entire circumference of the outer circumferential edge 31e of the circuit substrate 31. The inner diameter of each capacitor lead wire insertion hole 42h becomes smaller from the surface of the mounting wall 42a, into which the capacitor lead wires 36d are inserted, toward the outer surface 42e of the mounting wall 42a. The capacitor lead wire insertion hole 42h thus has a tapered shape.

As illustrated in FIG. 1, the edge of the coil holding portion circumferential wall 41b opposite to the coil holding portion bottom wall 41a and the edges of the support walls 42b and the coupling wall 42c opposite to the mounting wall 42a each contact the inner surface of the case bottom wall 24a. The tubular portions 25f each contact the end face 48e of the corresponding one of the boss portions 48. The inside of each tubular portion 25*f* is continuous with the inside of the corresponding boss portion 48. Each screw member 52 is inserted into the corresponding screw insertion hole 25*h*, the inside of the corresponding tubular portion 25*f*, the inside of the corresponding boss portion 48, and the corresponding screw insertion hole 24*h* in this order. Then, the screw members 52 are screwed into the corresponding internally threaded holes 13*c*. In this manner, the inverter case 14 is attached to the bottom wall 13*a* of the motor housing member 13 in a state in which the opening of the case body 24 is closed by the lid member 25.

As has been described, the edge of the coil holding portion circumferential wall 41*b* opposite to the coil holding portion bottom wall 41*a* and the edges of the support walls 42*b* and the coupling wall 42*c* opposite to the mounting wall 42*a* each contact the inner surface of the case bottom wall 24*a*. The tubular portions 25*f* contact the end faces 48*e* of the corresponding boss portions 48 and contact the sections around the corresponding screw insertion holes 24*h* in the opening end face of the case body 24. Therefore, the axial force of each screw member 52 causes the holder 40 to be sandwiched between the case body 24 and the lid member 25 and, in this state, attached to the inverter case 14. The holder 40 is thus arranged in the inverter accommodating chamber 14*a* and, in this state, attached to the inverter case 14. In other words, the screw members 52 are inserted into the corresponding boss portions 48 to attach the holder 40 to the inverter case 14.

The operation of the present embodiment will now be described.

The circuit substrate 31 is disposed at the inner side of the holder circumferential wall 47 such that the bulging portion 49*f* is engaged with the recess 31*k*, the outer circumferential surfaces of the boss portions 48 are arranged along the corresponding extending edges 31*f*, the first projection 49*a* is inserted into the first insertion hole 31*g*, and the second projection 49*b* is inserted into the second insertion hole 31*h*. The circuit substrate 31 is thus mounted on the substrate mounting surface 46*a* of the holder 40.

The holder 40 and the circuit substrate 31 are positioned relative to each other by inserting the first projection 49*a* and the second projection 49*b* respectively into the first insertion hole 31*g* and the second insertion hole 31*h*. In other words, the first and second projections 49*a*, 49*b* are multiple positioning projections disposed in the holder 40. The first and second insertion holes 31*g*, 31*h* are multiple positioning holes provided in the circuit substrate 31. The positioning projections are inserted into the corresponding positioning holes. That is, the holder 40 and the circuit substrate 31 both have positioning portions for positioning the holder 40 and the circuit substrate 31. The positioning portions include the first and second projections 49*a*, 49*b* and the first and second insertion holes 31*g*, 31*h*.

In the state after the holder 40 and the circuit substrate 31 are positioned in the above-described manner, the coil lead wire insertion holes 41*c* overlap with the coil lead wire connecting holes 31*a* in the thickness direction of the circuit substrate 31. Also, the capacitor lead wire insertion holes 42*h* overlap with the capacitor lead wire connecting holes 31*b* in the thickness direction of the circuit substrate 31. Further, the element lead wire insertion holes 43*h* overlap with the element lead wire connecting holes 31*c* in the thickness direction of the circuit substrate 31. The bus bars 51*a* are inserted into the corresponding connector lead wire connecting holes 31*d*.

The coil lead wires 37*a* are inserted into the corresponding coil lead wire insertion holes 41*c* from the side opposite to the circuit substrate 31. Each of the coil lead wire insertion holes 41*c* guides the corresponding one of the coil lead wires 37*a* toward the coil lead wire connecting hole 31*a*. In other words, each coil lead wire insertion hole 41*c* is a guide hole that extends in the same direction as the direction in which each bus bar 51*a* projects from the holder 40 and guides the corresponding coil lead wire 37*a* toward the coil lead wire connecting hole 31*a* of the circuit substrate 31.

Also, in the state after the holder 40 and the circuit substrate 31 are positioned in the above-described manner, each coil lead wire 37*a* is guided by the corresponding coil lead wire insertion hole 41*c* toward the corresponding coil lead wire connecting hole 31*a*. This facilitates the insertion of the coil lead wires 37*a* into the corresponding coil lead wire connecting holes 31*a* of the circuit substrate 31. As a result, the coil 37 is held by the coil holding portion 41.

The capacitor lead wires 36*d* are inserted into the corresponding capacitor lead wire insertion holes 42*h* from the side opposite to the circuit substrate 31. Each of the capacitor lead wire insertion holes 42*h* guides the corresponding one of the capacitor lead wires 36*d* toward the capacitor lead wire connecting hole 31*b*. In other words, each capacitor lead wire insertion hole 42*h* is a guide hole that extends in the same direction as the direction in which each bus bar 51*a* projects from the holder 40 and guides the corresponding capacitor lead wire 36*d* toward the capacitor lead wire connecting hole 31*b* of the circuit substrate 31.

Particularly, each capacitor lead wire insertion hole 42*h* has a tapered shape and the inner diameter of the capacitor lead wire insertion hole 42*h* becomes smaller from the surface of the mounting wall 42*a*, into which the capacitor lead wires 36*d* are inserted, toward the outer surface 42*e* of the mounting wall 42*a*. This facilitates the guiding of the capacitor lead wires 36*d* to the corresponding capacitor lead wire connecting holes 31*b* by means of the capacitor lead wire insertion holes 42*h*.

Also, in the state after the holder 40 and the circuit substrate 31 are positioned, each capacitor lead wire 36*d* is guided by the corresponding capacitor lead wire insertion hole 42*h* toward the corresponding capacitor lead wire connecting hole 31*b*. This facilitates the insertion of the capacitor lead wires 36*d* into the corresponding capacitor lead wire connecting holes 31*b* of the circuit substrate 31. As a result, the capacitor 36 is held by the capacitor holding portion 42.

The element lead wires 39*a* are inserted into the corresponding element lead wire insertion holes 43*h* from the side opposite to the circuit substrate 31. Each of the element lead wire insertion holes 43*h* guides the corresponding one of the element lead wires 39*a* toward the element lead wire connecting hole 31*c*. In other words, each element lead wire insertion hole 43*h* is a guide hole that extends in the same direction as the direction in which each bus bar 51*a* projects from the holder 40 and guides the corresponding element lead wire 39*a* toward the element lead wire connecting hole 31*c* of the circuit substrate 31.

Also, in the state after the holder 40 and the circuit substrate 31 are positioned, each element lead wire 39*a* is guided by the corresponding element lead wire insertion hole 43*h* toward the corresponding element lead wire connecting hole 31*c*. This facilitates the insertion of the element lead wires 39*a* into the corresponding element lead wire connecting holes 31c of the circuit substrate 31. As a result, the intelligent power module 39 is held by the element holding portion 43.

The coil 37 is electrically connected to the circuit substrate 31 by soldering or the like in a state in which the coil lead wires 37a are inserted into the corresponding coil lead wire connecting holes 31a. The coil 37 is thus mounted on the circuit substrate 31 through the coil lead wires 37a. The capacitor 36 is electrically connected to the circuit substrate 31 by soldering or the like in a state in which the capacitor lead wires 36d are inserted into the corresponding capacitor lead wire connecting holes 31b. The capacitor 36 is thus mounted on the circuit substrate 31 through the capacitor lead wires 36d. The intelligent power module 39 is electrically connected to the circuit substrate 31 by soldering or the like in a state in which the element lead wires 39a are inserted into the corresponding element lead wire connecting holes 31c. The intelligent power module 39 is thus mounted on the circuit substrate 31 through the element lead wires 39a.

The connectors 51 are electrically connected to the circuit substrate 31 by soldering or the like in a state in which the bus bars 51a are inserted into the corresponding connector lead wire connecting holes 31d. This ensures electrical connection of the connectors 51 to the circuit substrate 31. In this manner, the holder 40, the circuit substrate 31, the capacitor 36, the coil 37, the intelligent power module 39, and the connectors 51 are integrated with one another.

The holder 40 is disposed in the case body 24 such that the edge of the coil holding portion circumferential wall 41b opposite to the coil holding portion bottom wall 41a and the edges of the support walls 42b and the coupling wall 42c opposite to the mounting wall 42a each contact the inner surface of the case bottom wall 24a. The conductive members 27 are inserted into the connecting terminals 51b of the corresponding connectors 51 and thus electrically connected to the connectors 51.

The connectors 51 are integrated with the holder 40 with the bus bars 51a projecting from the holder 40. Therefore, when the bus bars 51a are connected to the circuit substrate 31 and, in this state, the conductive members 27 of the terminal pin 26 are inserted into the corresponding connecting terminals 51b, the load applied from the terminal pin 26 to the connectors 51 is received by the holder 40. The load applied from the terminal pin 26 to the connectors 51 is thus unlikely to act on the bus bars 51a. This limits breakage in a portion connecting with the bus bar 51a on the circuit substrate 31 (for example, soldering positions). Also, the holder 40 has the holder circumferential wall 47, which surrounds the connectors 51 and is arranged at the outer side with respect to the outer circumferential edge 31e of the circuit substrate 31. Therefore, when the conductive members 27 of the terminal pin 26 are inserted into the connecting terminals 51b of the corresponding connectors 51 in a state in which the bus bars 51a of the connectors 51 are electrically connected to the circuit substrate 31, the holder circumferential wall 47 as a circumferential wall section is pressed such that external force acts uniquely on the holder 40. The load applied from the terminal pin 26 to the connectors 51 is thus unlikely to act on the bus bars 51a and/or the circuit substrate 31. This limits breakage in a portion connecting with the bus bar 51a on the circuit substrate 31 (for example, soldering positions) and decreases breakage in the circuit substrate 31.

With reference to FIG. 1, the lid member 25 is joined to the case body 24 such that the opening end face of the case circumferential wall 24b and the opening end face of the lid circumferential wall 25b face and contact each other. In this state, the tubular portions 25f contact the end faces 48e of the corresponding boss portions 48 and the inside of each tubular portion 25f is continuous with the inside of the corresponding boss portion 48. The screw members 52 are each inserted into the corresponding screw insertion hole 25h, the inside of the tubular portion 25f, the inside of the boss portion 48, and the screw insertion hole 24h in this order and screwed into the internally threaded hole 13c. The inverter case 14 is thus attached to the bottom wall 13a of the motor housing member 13 in a state in which the opening of the case body 24 is closed by the lid member 25.

By connecting the connector of the high-voltage power source 32 to the high-voltage connector 25c, the electric power from the high-voltage power source 32 is supplied to the motor coil 21 through the circuit substrate 31, the connectors 51, the conductive members 27, the cluster block 29, and the motor wires 21a. This rotates the rotor 20, thus rotating the rotary shaft 15 integrally with the rotor 20.

By inserting the first projection 49a into the first insertion hole 31g and the second projection 49b into the second insertion hole 31h, the holder 40 and the circuit substrate 31 are positioned relative to each other. This hinders movement of the circuit substrate 31 relative to the holder 40 in a state in which the capacitor lead wires 36d, the coil lead wires 37a, and the element lead wires 39a are respectively inserted into the capacitor lead wire connecting holes 31b, the coil lead wire connecting holes 31a, and the element lead wire connecting holes 31c. The bending of the capacitor lead wires 36d, the coil lead wires 37a, and the element lead wires 39a is thus limited.

The above-described embodiment has the following advantages.

(1) The connectors 51 are integrated with the holder 40 in a state in which the bus bars 51a are projected. The holder 40 and the circuit substrate 31 are positioned relative to each other by inserting the first projection 49a and the second projection 49b respectively into the first insertion hole 31g and the second insertion hole 31h. The holder 40 has the coil lead wire insertion holes 41c, the capacitor lead wire insertion holes 42h, and the element lead wire insertion holes 43h, which extend in the same direction as the direction in which the bus bars 51a project from the holder 40. The coil lead wire insertion holes 41c, the capacitor lead wire insertion holes 42h, and the element lead wire insertion holes 43h respectively guide the coil lead wires 37a, the capacitor lead wires 36d, and the element lead wires 39a toward the coil lead wire connecting holes 31a, the capacitor lead wire connecting holes 31b, and the element lead wire connecting holes 31c.

In this configuration, since the connectors 51 are integrated with the holder 40 in a state in which the bus bars 51a are projected, the load applied from the terminal pin 26 to the connectors 51 is received by the holder 40. The load applied from the terminal pin 26 to the connectors 51 is thus unlikely to act on the bus bars 51a. This limits breakage in a portion connecting with the bus bar 51a on the circuit substrate 31 (for example, soldering positions).

By inserting the first projection 49a into the first insertion hole 31g and inserting the second projection 49b into the second insertion hole 31h, the holder 40 and the circuit substrate 31 are positioned relative to each other. In this case, the holder 40 is fixed to the circuit substrate 31. This hinders movement of the circuit substrate 31 relative to the holder 40 in a state in which the capacitor lead wires 36d, the coil lead wires 37a, and the element lead wires 39a are respectively inserted into the capacitor lead wire connecting holes 31*b*, the coil lead wire connecting holes 31*a*, and the element lead wire connecting holes 31*c*. This limits bending in the capacitor lead wires 36*d*, the coil lead wires 37*a*, and the element lead wires 39*a*.

The coil lead wire insertion holes 41*c*, the capacitor lead wire insertion holes 42*h*, and the element lead wire insertion holes 43*h* respectively guide the coil lead wires 37*a*, the capacitor lead wires 36*d*, and the element lead wires 39*a* toward the coil lead wire connecting holes 31*a*, the capacitor lead wire connecting holes 31*b*, and the element lead wire connecting holes 31*c*. This facilitates the insertion of the coil lead wires 37*a*, the capacitor lead wires 36*d*, and the element lead wires 39*a* respectively into the coil lead wire connecting holes 31*a*, the capacitor lead wire connecting holes 31*b*, and the element lead wire connecting holes 31*c* in the circuit substrate 31. This limits bending in the bus bars 51*a*, the coil lead wires 37*a*, and the capacitor lead wires 36*d* and improves the assemblability.

(2) The first projection 49*a* and the second projection 49*b* are positioning projections provided in the holder 40. The first insertion hole 31*g* and the second insertion hole 31*h* are positioning holes formed in the circuit substrate 31. The positioning projections are inserted into the corresponding positioning holes. In other words, the holder 40 and the circuit substrate 31 both include positioning portions for positioning the holder 40 and the circuit substrate 31. In this configuration, by inserting the first projection 49*a* and the second projection 49*b* respectively into the first insertion hole 31*g* and the second insertion hole 31*h*, the holder 40 and the circuit substrate 31 are positioned relative to each other. Therefore, the first and second projections 49*a*, 49*b* of the holder 40 and the first and second insertion holes 31*g*, 31*h* in the circuit substrate 31 are suitable to be the positioning portions for positioning the holder 40 and the circuit substrate 31.

(3) The holder circumferential wall 47 surrounds the entire circumference of the outer circumferential edge 31*e* of the circuit substrate 31. The holder circumferential wall 47 thus ensures insulation between the outer circumferential edge 31*e* of the circuit substrate 31 and the inner circumferential surface of the inverter case 14. In other words, such insulation is ensured without maintaining a sufficiently great distance between the outer circumferential edge 31*e* of the circuit substrate 31 and the inner circumferential surface of the inverter case 14. This saves space in the inverter case 14, thus reducing the size of the motor-driven compressor 10.

(4) In the present embodiment, the bus bars 51*a* are inserted into the connector lead wire connecting holes 31*d* only after the circuit substrate 31 is arranged at the inner side of the holder circumferential wall 47 in a state in which the bulging portion 49*f* is engaged with the recess 31*k*. In this state, the coil lead wire insertion holes 41*c*, the capacitor lead wire insertion holes 42*h*, and the element lead wire insertion holes 43*h* respectively overlap with the coil lead wire connecting holes 31*a*, the capacitor lead wire connecting holes 31*b*, and the element lead wire connecting holes 31*c* in the thickness direction of the circuit substrate 31. In this manner, the circuit substrate 31 to the holder 40 are prevented from being assembled in the wrong positional relationship. This facilitates the assemblability.

(5) Each of the capacitor lead wire insertion holes 42*h* has a tapered shape. The inner diameter of each capacitor lead wire insertion hole 42*h* thus becomes smaller from the surface of the mounting wall 42*a*, into which the capacitor lead wires 36*d* are inserted, toward the outer surface 42*e* of the mounting wall 42*a*. This facilitates the guiding of the capacitor lead wires 36*d* to the corresponding capacitor lead wire connecting holes 31*b* by means of the capacitor lead wire insertion holes 42*h*. This further improves the assemblability.

(6) The connector holding portion 44 is coupled to the inner surface of the fourth mounting portion 46*4* by the two thirteenth beam portions 45*q*. The connector holding portion 44 is also coupled to one (the fourth boss portion 48*4*) of the boss portions 48 that are located at the opposite sides of the fourth mounting portion 46*4* by the fourteenth beam portion 45*r*. Further, the connector holding portion 44 is coupled to the other one (the first boss portion 48*1*) of the boss portions 48 that are located at the opposite sides of the fourth mounting portion 46*4* by the fifteenth beam portion 45*s*. Therefore, the connector holding portion 44 can have a lightening structure about the holder 40. This ensures the rigidity necessary for receiving the load applied from the terminal pin 26 to the connectors 51 by means of the holder 40 and reduces the weight of the holder 40 as a whole.

The above-described embodiment may be modified as follows. The above-described embodiment and the following modifications can be combined as long as the combined modifications remain technically consistent with each other.

The holder 40 may lack the first and second projections 49*a*, 49*b*. Also, the circuit substrate 31 may lack the first and second insertion holes 31*g*, 31*h*. For example, the holder 40 and the circuit substrate 31 may be positioned by causing the outer circumferential edge 31*e* of the circuit substrate 31 to contact the inner circumferential surface of the holder circumferential wall 47. In this case, the outer circumferential edge 31*e* of the circuit substrate 31 and the inner circumferential surface of the holder circumferential wall 47 each constitute a positioning portion for positioning the holder 40 and the circuit substrate 31. The positioning portions thus include the outer circumferential edge 31*e* of the circuit substrate 31 and the inner circumferential surface of the holder circumferential wall 47. Thus, the outer circumferential edge 31*e* of the circuit substrate 31, which extends along the inner circumferential surface of the holder circumferential wall 47, and the inner circumferential surface of the holder circumferential wall 47 are both suitable to be the positioning portion for positioning the holder 40 and the circuit substrate 31.

The holder 40 may lack the first and second projections 49*a*, 49*b*. Also, the circuit substrate 31 may lack the first and second insertion holes 31*g*, 31*h*. For example, the holder 40 and the circuit substrate 31 may be positioned by causing the extending edges 31*f* of the circuit substrate 31 to contact the outer circumferential surfaces of the corresponding boss portions 48. In this case, every extending edge 31*f* of the circuit substrate 31 and the outer circumferential surface of every boss portion 48 constitute positioning portions for positioning the holder 40 and the circuit substrate 31. The positioning portions thus include the extending edges 31*f* of the circuit substrate 31 and the outer circumferential surfaces of the boss portions 48. Thus, the extending edges 31*f* of the circuit substrate 31, which extend along the outer circumferential surfaces of the corresponding boss portions 48, and the outer circumferential surfaces of the boss portions 48, which the extending edges 31*f* can contact, are suitable to be the positioning portions for positioning the holder 40 and the circuit substrate 31.

The holder 40 and the circuit substrate 31 may be positioned by causing the outer circumferential edge 31*e* of the circuit substrate 31 to contact the inner circumferential surface of the holder circumferential wall 47, in addition to inserting the first projection 49*a* and the second projection 49*b* respectively into the first insertion hole 31*g* and the second insertion hole 31h. In this case, the positioning portions include the first and second projections 49a, 49b, the first and second insertion holes 31g, 31h, the outer circumferential edge 31e of the circuit substrate 31, and the inner circumferential surface of the holder circumferential wall 47.

The holder 40 and the circuit substrate 31 may be positioned by causing the extending edges 31f of the circuit substrate 31 to contact the outer circumferential surfaces of the corresponding boss portions 48, in addition to inserting the first projection 49a and the second projection 49b respectively into the first insertion hole 31g and the second insertion hole 31h. In this case, the positioning portions include the first and second projections 49a, 49b, the first and second insertion holes 31g, 31h, the extending edges 31f of the circuit substrate 31, and the outer circumferential surfaces of the boss portions 48.

The holder 40 and the circuit substrate 31 may be positioned by, for example, causing the outer circumferential edge 31e of the circuit substrate 31 to contact the inner circumferential surface of the holder circumferential wall 47 and then causing the extending edges 31f of the circuit substrate 31 to contact the outer circumferential surfaces of the corresponding boss portions 48, in addition to inserting the first projection 49a and the second projection 49b respectively into the first insertion hole 31g and the second insertion hole 31h. In this case, the positioning portions include the first and second projections 49a, 49b, the first and second insertion holes 31g, 31h, the outer circumferential edge 31e of the circuit substrate 31, the inner circumferential surface of the holder circumferential wall 47, the extending edges 31f of the circuit substrate 31, and the outer circumferential surfaces of the boss portions 48.

The circuit substrate 31 may be configured to have multiple through-holes through which the corresponding boss portions 48 extend. In this case, the inner circumferential surface of each of the through-holes is an extending edge that extends along the outer circumferential surface of the corresponding one of the boss portions 48.

The number of boss portions 48 may be changed. In this case, the number of extending edges 31f in the circuit substrate 31 must be changed in correspondence with the number of boss portions 48.

The boss portions 48 do not necessarily have to have a circular shape and may have, for example, a rectangular tubular shape. The shapes of the boss portions 48 are not restricted in any particular manner. In this case, the shape of each extending edge 31f in the circuit substrate 31 must be changed in a manner matching the shape of the corresponding boss portion 48.

The locations of the coil holding portion 41, the capacitor holding portion 42, the element holding portion 43, and the connector holding portion 44 are not restricted in any particular manner and may be changed as needed.

The holder 40 may lack the coil holding portion 41. The holder 40 does not necessarily have to be configured to be capable of holding the coil 37.

The holder 40 may lack the capacitor holding portion 42. The holder 40 does not necessarily have to be configured to be capable of holding the capacitor 36.

The holder 40 may lack the element holding portion 43. The holder 40 does not necessarily have to be configured to be capable of holding the intelligent power module 39.

Adhesive does not necessarily have to be provided between the coil 37 and the coil holding portion bottom wall 41a.

Adhesive does not necessarily have to be provided between the capacitor 36 and the mounting wall 42a.

Adhesive does not necessarily have to be provided between the intelligent power module 39 and the mounting surface 43a.

The circuit substrate 31 does not necessarily have to have a circular shape and may have, for example, a rectangular plate-like shape. In other words, the shape of the circuit substrate 31 is not restricted in any particular manner. Also, the shape of the holder circumferential wall 47 may be changed in a manner matching the shape of the circuit substrate 31. That is, if, for example, the circuit substrate 31 has a rectangular plate-like shape, the holder circumferential wall 47 may have a rectangular tubular shape.

The holder 40 may lack the bulging portion 49f. In this case, it is unnecessary to provide the recess 31k in the outer circumferential edge 31e of the circuit substrate 31.

Each coil lead wire insertion hole 41c may have a tapered shape. In other words, the inner diameter of the coil lead wire insertion hole 41c may become smaller from the surface of the coil holding portion bottom wall 41a, into which the coil lead wires 37a are inserted, toward the outer surface 41e of the coil holding portion bottom wall 41a. This facilitates the guiding of the coil lead wires 37a to the coil lead wire connecting holes 31a by means of the corresponding coil lead wire insertion holes 41c. This further improves the assemblability.

Each element lead wire insertion hole 43h may have a tapered shape. In other words, the inner diameter of the element lead wire insertion hole 43h may become smaller from the mounting surface 43a toward the outer surface 43e of the element holding portion 43. This facilitates the guiding of the element lead wires 39a to the element lead wire connecting holes 31c by means of the corresponding element lead wire insertion holes 43h. This further improves the assemblability.

Each capacitor lead wire insertion hole 42h may have a tapered shape.

The coil 37 may be, for example, a normal mode coil.

The motor-driven compressor 10 may include a resistor electrically connected to the capacitor 36 as an electronic component. The resistor is, for example, a discharge resistor that is connected in parallel with the capacitor 36. When a power source line, such as the first connecting line EL1 or the second connecting line EL2, breaks, the resistor discharges charge accumulated in the capacitor 36. Alternatively, the resistor may be a damping resistor, instead of the discharge resistor. In other words, the motor-driven compressor 10 may include any resistor electrically connected to the capacitor 36 as an electronic component and the use of the resistor is not restricted in any particular manner.

The inverter accommodating chamber 14a may be defined by the bottom wall 13a of the motor housing member 13 and a tubular cover member with a closed end that is attached to the bottom wall 13a. In this case, the holder 40 is attached to the inverter case 14 in a state sandwiched between the bottom wall 13a of the motor housing member 13 and the cover member, for example.

Each connector 51 may have a configuration including the bus bars 51a and the corresponding connecting terminals 51b that are integrated in advance, instead of the configuration including the proximal ends of the bus bars 51a and the connecting terminals 51b that are welded and integrated with each other.

In the motor-driven compressor 10, the motor controller 30 may be disposed at the outer side with respect to the housing 11 in the radial direction of the rotary shaft 15. In other words, the compression portion 16, the electric motor 17, and the motor controller 30 do not necessarily have to be arranged in this order in the axial direction of the rotary shaft 15.

The compression portion 16 is not restricted to a scroll type and may be a piston type or a vane type.

Although the motor-driven compressor 10 is a component of the vehicle air conditioner 23, the motor-driven compressor 10 is not restricted to this. The motor-driven compressor 10 may be, for example, a compressor that is mounted in a fuel cell vehicle and compresses air as fluid supplied to the fuel cell.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A motor-driven compressor comprising:
    a compression portion that compresses fluid;
    an electric motor that drives the compression portion;
    a motor controller that has a circuit substrate for driving the electric motor;
    a housing that has an inverter accommodating chamber for accommodating the motor controller;
    a connector that has a connecting terminal and a bus bar, the bus bar being provided to electrically connect the connecting terminal to the circuit substrate;
    a terminal pin that is fixed to the housing and removably inserted in the connecting terminal, thereby electrically connecting the connector and the electric motor to each other;
    an electronic component that is electrically connected to the circuit substrate; and
    a holder made of plastic that holds the electronic component, the circuit substrate being fixed to the holder, wherein
    the connector is integrated with the holder in a state in which the bus bar is electrically connected to the circuit substrate,
    the holder has a holder circumferential wall that surrounds the connector and is arranged at an outer side of an outer circumferential edge of the circuit substrate,
    the holder has a substrate mounting surface on which the circuit substrate is mounted, and
    the holder circumferential wall extends from the substrate mounting surface in a direction in which the terminal pin is inserted in the connecting terminal.

2. The motor-driven compressor according to claim 1, wherein
    the holder and the circuit substrate each include a positioning portion for positioning the holder and the circuit substrate relative to each other,
    the positioning portion of the holder includes a plurality of positioning projections that are disposed in the holder, and
    the positioning portion of the circuit substrate includes a plurality of positioning holes that are provided in the circuit substrate, wherein the positioning projections are inserted into the corresponding positioning holes.

3. The motor-driven compressor according to claim 2, wherein the electronic component is one of multiple electronic components that include a filter element and a switching element.

4. The motor-driven compressor according to claim 1, wherein
    the holder circumferential wall extends from an outer circumferential section of the substrate mounting surface,
    the holder and the circuit substrate each include a positioning portion for positioning the holder and the circuit substrate relative to each other,
    the positioning portion of the circuit substrate includes the outer circumferential edge of the circuit substrate that extends along an inner circumferential surface of the holder circumferential wall, and
    the positioning portion of the holder includes the inner circumferential surface of the holder circumferential wall that the outer circumferential edge of the circuit substrate is allowed to contact.

5. The motor-driven compressor according to claim 4, wherein the electronic component is one of multiple electronic components that include a filter element and a switching element.

6. The motor-driven compressor according to claim 1, wherein
    the holder has a plurality of tubular boss portions, wherein screw members are inserted into the corresponding boss portions to attach the holder to the housing,
    the holder and the circuit substrate each include a positioning portion for positioning the holder and the circuit substrate relative to each other,
    the positioning portion of the circuit substrate includes extending edges of the circuit substrate each of which extends along an outer circumferential surface of the corresponding one of the boss portions, and
    the positioning portion of the holder includes the outer circumferential surfaces of the boss portions that the corresponding extending edges are allowed to contact.

7. The motor-driven compressor according to claim 6, wherein the electronic component is one of multiple electronic components that include a filter element and a switching element.

8. The motor-driven compressor according to claim 1, wherein the electronic component is one of multiple electronic components that include a filter element and a switching element.

9. A motor-driven compressor comprising:
    a compression portion that compresses fluid;
    an electric motor that drives the compression portion;
    a motor controller that has a circuit substrate for driving the electric motor;
    a housing that has an inverter accommodating chamber for accommodating the motor controller;
    a connector that has a connecting terminal and a bus bar, the bus bar being provided to electrically connect the connecting terminal to the circuit substrate;
    a terminal pin that is fixed to the housing and removably inserted in the connecting terminal, thereby electrically connecting the connector and the electric motor to each other;
    an electronic component that is electrically connected to the circuit substrate; and a holder made of plastic that holds the electronic component, the circuit substrate being fixed to the holder, wherein the connector is integrated with the holder in a state in which the bus bar is electrically connected to the circuit substrate, the holder has a holder circumferential wall that surrounds the connector and is arranged at an outer side of an outer circumferential edge of the circuit substrate, the holder has a substrate mounting surface on which the circuit substrate is mounted, the holder circumferential wall extends from an outer circumferential section of the substrate mounting surface, the holder and the circuit substrate each include a positioning portion for positioning the holder and the circuit substrate relative to each other, the positioning portion of the circuit board includes an outer circumferential edge of the circuit substrate that extends along an inner circumferential surface of the holder circumferential wall, and the positioning portion of the holder includes the inner circumferential surface of the holder circumferential wall that the outer circumferential edge of the circuit substrate is allowed to contact.

10. The motor-driven compressor according to claim 9, wherein the electronic component is one of multiple electronic components that include a filter element and a switching element.

11. A motor-driven compressor comprising:

a compression portion that compresses fluid;

an electric motor that drives the compression portion;

a motor controller that has a circuit substrate for driving the electric motor;

a housing that has an inverter accommodating chamber for accommodating the motor controller;

a connector that has a connecting terminal and a bus bar, the bus bar being provided to electrically connect the connecting terminal to the circuit substrate;

a terminal pin that is fixed to the housing and removably inserted in the connecting terminal, thereby electrically connecting the connector and the electric motor to each other;

an electronic component that is electrically connected to the circuit substrate; and a holder made of plastic that holds the electronic component, the circuit substrate being fixed to the holder, wherein the connector is integrated with the holder in a state in which the bus bar is electrically connected to the circuit substrate, the holder has a holder circumferential wall that surrounds the connector and is arranged at an outer side of an outer circumferential edge of the circuit substrate, the holder has a plurality of tubular boss portions, wherein screw members are inserted into the corresponding boss portions to attach the holder to the housing, the holder and the circuit substrate each include a positioning portion for positioning the holder and the circuit substrate relative to each other, the positioning portion of the circuit substrate includes extending edges of the circuit substrate each of which extends along an outer circumferential surface of the corresponding one of the boss portions, and the positioning portion of the holder includes the outer circumferential surfaces of the boss portions that the corresponding extending edges are allowed to contact.

12. The motor-driven compressor according to claim 11, wherein the electronic component is one of multiple electronic components that include a filter element and a switching element.

* * * * *